Dec. 19, 1933.　　　A. MALINOVSZKY　　　1,940,554
METHOD AND APPARATUS FOR MANUFACTURING CERAMIC BODIES
Filed April 27, 1932　　　5 Sheets-Sheet 1

Inventor
Andrew Malinovszky
By Lyon & Lyon
Attorneys

Dec. 19, 1933.  A. MALINOVSZKY  1,940,554
METHOD AND APPARATUS FOR MANUFACTURING CERAMIC BODIES
Filed April 27, 1932   5 Sheets-Sheet 2
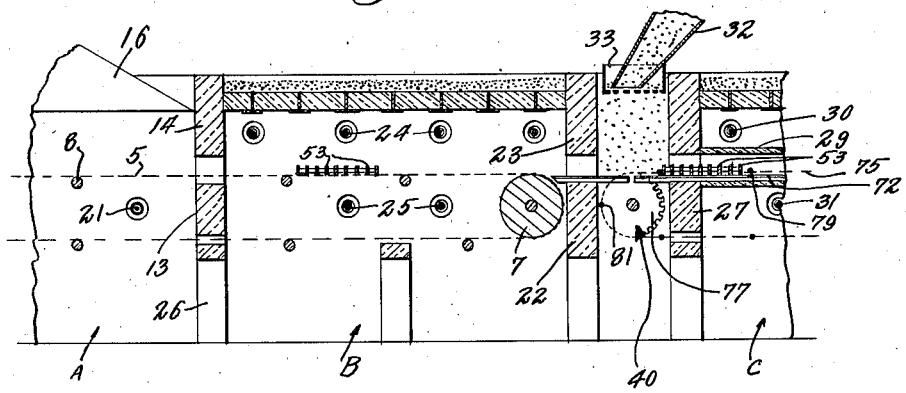
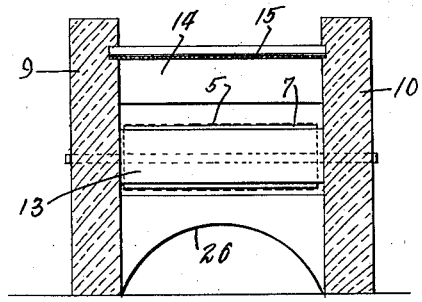
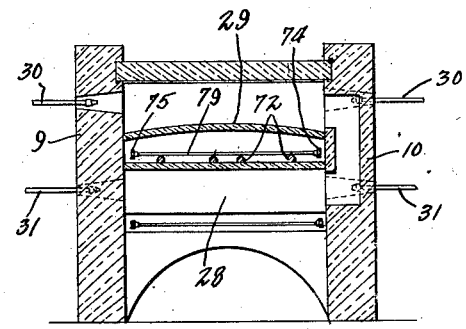
Inventor
Andrew Malinovszky
By Lyon & Lyon
Attorneys Dec. 19, 1933. A. MALINOVSZKY 1,940,554
METHOD AND APPARATUS FOR MANUFACTURING CERAMIC BODIES
Filed April 27, 1932 5 Sheets-Sheet 3
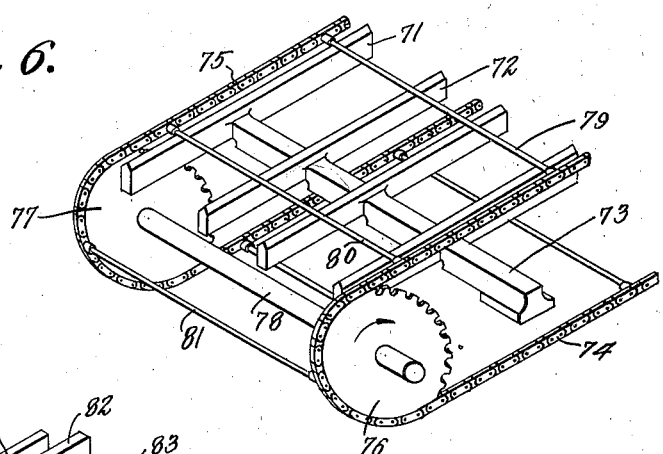
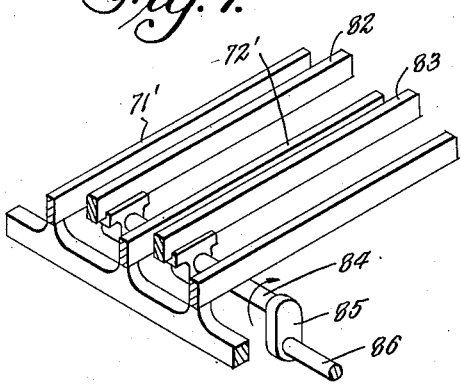
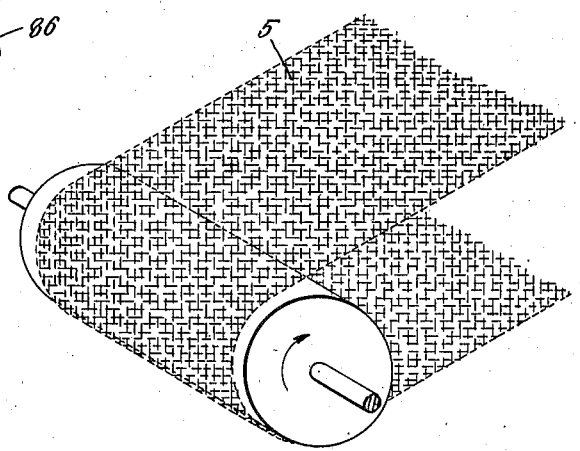
Inventor
Andrew Malinovszky
By Lyon+Lyon
Attorneys Dec. 19, 1933.       A. MALINOVSZKY       1,940,554
METHOD AND APPARATUS FOR MANUFACTURING CERAMIC BODIES
Filed April 27, 1932     5 Sheets-Sheet 4

Inventor
Andrew Malinovszky
By Lyon & Lyon
Attorneys

Inventor
Andrew Malinovszky
By Lyon & Lyon
Attorneys

Patented Dec. 19, 1933

1,940,554

UNITED STATES PATENT OFFICE 1,940,554

METHOD AND APPARATUS FOR MANUFACTURING CERAMIC BODIES

Andrew Malinovszky, South Gate, Calif., assignor to Malinite Products, Inc., Los Angeles, Calif., a corporation of California Application April 27, 1932. Serial No. 607,739

12 Claims. (Cl. 25—142)

This invention relates to a method of manufacturing ceramic bodies in a rapid and economical manner. The method of manufacturing may include drying, burning to maturity, the application of glazing materials to ceramic bodies, the burning of such glaze-bearing bodies to mature the glaze, and a final cooling; but it is to be understood that the invention is not limited to this complete combination of steps but instead is also directed to methods of merely drying and burning to maturity in accordance with this invention without the inclusion of the subsequent steps.

It may be said that the invention particularly relates to a method of manufacturing tile bodies and/or glazed tile and has for its object the conservation of heat during the burning operations and the prevention of distortion, cracking, checking, warping and other imperfections and obstacles encountered in prior manufacturing procedures.

The invention is also directed toward the use of specific elements whereby heat may be imparted to the ceramic bodies in a uniform and economical manner. For example, the invention contemplates the utilization of materials having a high thermal conductivity and a specific heat lower than that of the ceramic bodies being treated, and the transmission of heat to the ceramic bodies by conduction as well as by radiation and convection.

The invention also relates to a novel arrangement of elements by means of which the manufacture of ceramic bodies, and particularly decorative or glazed tile, may be greatly facilitated.

In order to facilitate understanding of this invention, the subsequent description will be limited to the adaptation of the methods and apparatus of this invention to the manufacture of tile bodies and glazed tile, although it is to be understood that the method and apparatus herein disclosed is applicable to various other uses and to the manufacture of various kinds and varieties of ceramic products. The method and apparatus of this invention have been found to be particularly efficacious in the manufacture of tiles from a mixture consisting essentially of ground glass, ground magnesite or other magnesia-containing materials, together with relatively small proportions of clay, silica and fluxing agents such as lead oxide, borax, etc. The tile bodies made from a composition of this nature consist essentially of particles of magnesia-containing material suspended in a matrix and incipiently fused glassy body. A body of this sort has been described in my previous Patent #1,819,686.

Tile bodies are ordinarily molded or pressed from a suitable mixture of ceramic materials and such bodies are then dried and finally burned. Decorative tile such as, for example, glazed tile or floor tile, are generally quite thin for economic reasons. Difficulty has been experienced in burning tile bodies of this character to the high temperatures required to mature the ingredients without causing the bodies to warp, crack or otherwise deform. Furthermore, it is desirable to have tile of this character provided with either keys or keyways in the rear surfaces thereof whereby such tile may be more readily cemented or attached to walls, ceilings or other surfaces. These keys or keyways further reduce the thickness of the tile and render the tile non-uniform in thickness.

Attempts have been made to burn tile of this character in tunnel kilns, the molded and dried tile bodies being placed upon the decks of tunnel cars which are then sent through tunnel kilns. These tunnel cars are very heavy, being provided with a very thick surface or deck made from fire brick or fire clay tile. Heat is imparted to the tile bodies, while they rest on the fire clay tile of the tunnel car deck, from points above the plane of the deck. One of the reasons why tunnel cars are provided with very thick refractory decks is that the prior art has considered it essential to prevent the heat from passing downwardly to the running gear of the cars.

It is evident that in these prior methods of manufacturing tile bodies, tremendous quantities of heat have been absorbed by the cars. Refractory brick and tile have a high specific heat and therefore, during the burning operation, the upper surface of the tile resting on the car deck may be exposed to a relatively high temperature but the lower surface of the tile is often several hundred degrees lower as the heat is being rapidly absorbed and conducted away from the upper surface by the fire clay brick and tile of the car deck. As a result, losses due to warpage and unequal burning of the tile, have been very great and the cost of the fuel has been abnormally large. The time element has also considerably added to the cost of the resulting products as it is necessary to pass the tile through the kiln at a very slow rate of speed because of the necessity of imparting tremendous quantities of heat to the tunnel cars.

Furthermore, it is impossible to maintain the decks of the tunnel cars absolutely level and the unequal expansion and warping of the refractory tile or brick constituting the surface on which the ceramic bodies being burned are supported, is transmitted to the ceramic bodies during the burning operation, thereby causing deformation of such bodies.

An object of this invention is to disclose and provide a method of burning ceramic bodies to maturity, which insures the uniform application of heat to the bodies, thereby to a large extent preventing the deformation of the ceramic bodies by reason of unequal shrinkage, and expansion.

Another object of this invention is to disclose and provide a method whereby the drying and burning to maturity of ceramic bodies may be carried out in a much more rapid and efficient manner than has been thought possible heretofore.

An object of the invention is to disclose and provide a method of simultaneously and concurrently applying heat to the upper and lower surfaces or portions of a ceramic body during a burning operation.

An object of the invention is also to disclose and provide a method whereby a maturing or glazing heat may be applied to ceramic bodies by concurrent radiation, convection and conduction.

An object of this invention is to disclose and provide a method of producing ceramic bodies whereby ceramic bodies molded to a particular shape may be raised to an elevated temperature without changing the shape of said bodies.

A still further object of this invention is to disclose and provide a method of burning ceramic bodies to vitrifying temperatures and of cooling said ceramic bodies while in contact with a support adapted to maintain the desired shape of the body.

An object of the invention is to provide means whereby ceramic objects may be dried and burned in a rapid and economical manner.

Another object of the invention is to disclose and provide means whereby heat may be imparted to ceramic bodies by conduction.

Another object of the invention is to disclose and provide a combination of elements whereby ceramic tile bodies may be supported and conveyed through a plurality of drying and heating zones in which the heat is most effectively and economically imparted to the bodies.

These and other objects, uses and advantages of the invention will become apparent to those skilled in the art from the following detailed description of the invention and certain modifications thereof.

In describing the invention, reference will be had to the appended drawings, in which:

Fig. 2 is an enlarged longitudinal section of a portion of the apparatus shown in Fig. 1.

Fig. 3 is a transverse section taken along the plane 3—3 of Fig. 1.

Fig. 4 is a transverse section taken along the plane 4—4 indicated in Fig. 1, the hopper 32 being omitted from this section.

Fig. 6 illustrates one form of means for moving ceramic bodies and their supports through the apparatus disclosed in Figs. 1, 2 and 5.

Fig. 7 illustrates another form of means for advancing ceramic bodies and their supports through the apparatus.

Fig. 8 illustrates another form of means for moving ceramic materials through the apparatus shown in Figs. 1 to 5.

Figure 1:
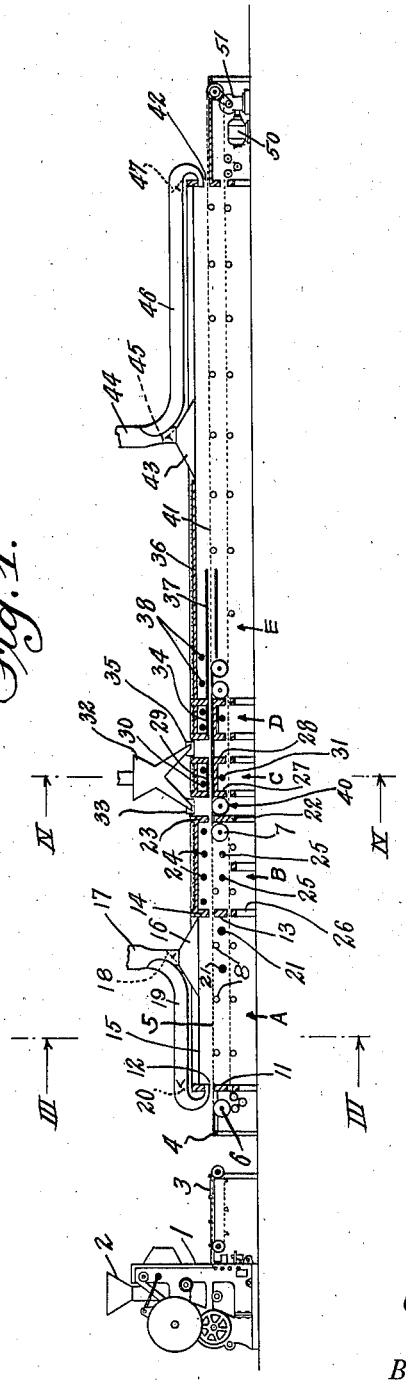
Fig. 1 is a general side elevation, partly in section, of an apparatus arranged in accordance with this invention.

As has been stated hereinbefore, the method contemplates a continuous series of operations in which the ceramic bodies can be molded, inspected, dried, biscuited, glazed and cooled. Fig. 1 illustrates an apparatus capable of carrying out these steps in accordance with this invention. As there shown, an automatic press 1 is provided with a feeding bin 2 for the raw material and a discharge and fettling table 3 directed toward the rest of the apparatus. The ceramic bodies on the fettling table may be inspected and selected and then placed upon suitable supports on the make-up table 4. The ceramic bodies and the supports on which they are carried, are then placed upon a means adapted to convey the supports and ceramic bodies through the rest of the apparatus.

The apparatus of this invention may comprise a plurality of furnaces in longitudinal alignment and means for conveying the tile or other ceramic bodies sequentially through such plurality of furnaces. As shown in Fig. 1, for example, the apparatus may consist of furnaces A, B, C, D and E longitudinally aligned with respect to one another. A suitable means for conveying, directing or feeding the ceramic bodies through said furnaces A, B, C, D and E is provided. Such means may assume a variety of forms and furthermore a different form may be used in one section or in one or more furnaces than the form employed in another portion or furnace of the entire device.

As shown in Figs. 1 and 2, for example, a continuous wire mesh belt 5 carried by rollers 6 and 7 may extend through the forward portion of the apparatus. The continuous wire mesh belt 5 is shown in greater detail in Fig. 8. This belt 5 is made of a heat-resisting alloy and passes through a chamber A into a heating chamber B. In such chambers, the belt 5 may be supported in any suitable manner as, for example, by longitudinally disposed, heat-resisting steel rails or rollers such as those indicated at 8. As the ceramic products are to be carried through the apparatus and through the various furnaces in the direction from A to E, the conveying means such as the belt 5 may be downwardly inclined towards the furnaces B, C, D and E, thereby facilitating the movement of the ceramic materials in the desired direction.

The furnace A as shown may include parallel side walls 9 and 10 and a front wall 11 provided with an inlet opening 12 through which the belt 5 is admitted and an outlet opening through which the belt 5 is returned. The further end of the furnace A may be provided with a wall portion in the form of an arch 13 between the upper and lower flights of the mesh belt 5. A secondary upper arch 14 forms the upper end wall of the furnace A, the space between the arches 13 and 14 permitting the belt 5 to pass into the adjoining furnace B.

The roof of the furnace A, indicated at 15, may be provided with a suction hood 16 connected to an exhaust fan as by means of a conduit 17. A suitable damper 18 may be positioned in said conduit. The conduit 17 may also have a branch line 19 leading to a point immediately above the inlet port 12, as shown. A damper 20 is positioned in the branch line 19.

The furnace A is preferably provided with heat sources such as burners 21 carried by the side walls 9 and 10 of said furnace, said burners 21 being positioned between the upper and lower flights of the conveyor belt 5. Furthermore, the burners 21 are positioned near the further end of the furnace A, that is, near the arch 13. It will be evident, therefore, that the furnace A supplies heat to the upper flight of the belt 5 but that such burners 21 act upon the bottom of such upper flight. Heat from such burners is imparted to the bottom of the ceramic bodies carried by the belt 5 and may be regulatably withdrawn either through the hood 16 or through the duct 19, such regulation being possible by reason of the dampers 18 and 20. In addition to the heat from the lower burners 21, some additional heat may be applied to the top of the tile in furnace A.

The next furnace in the series, namely, furnace B, also consists of side wall portions and utilizes the common wall or partition consisting of the arches 13 and 14. Similar arches 22 and 23 form the opposite end of the furnace B. The side walls of the furnace B carry a plurality of burners positioned above and also below the top flight of the conveyor belt 5. Preferably, the furnace B contains a greater number of burners or heat sources above the top flight of the belt 5 than therebelow. Top burners are indicated at 24 and burners positioned beneath the top flight of the belt 5 are indicated at 25. It is to be noted that the archway 13 forms an opening or conduit 26 which permits gases from the furnace B to enter the bottom portion of the furnace A. These gases, therefore, pass upwardly through the belt 5 and through the ceramic bodies carried thereby into the hood 16 or suction conduit 19. Such upward passage of gases supports the effect of the burners 21 of furnace A.

Furnace C may be somewhat longitudinally spaced from furnace B. Furthermore, such furnace C consists of parallel side walls and transverse or end walls consisting of archways spaced from the ground or supporting surface of the device in a manner similar to that of archways 13 and 14, and 22 and 23.

The heat is not directly imparted to the ceramic bodies passing through the furnace C, however. Instead, the two archways 27 and 28 forming the end walls of the furnace C are provided with an opening adapted to receive the ceramic bodies and a muffle indicated at 29 connects said arch walls 27 and 28 and the openings made therein. Suitable burners 30 are positioned above the muffle 29 in the furnace C and additional burners 31 are positioned below said muffle in said furnace. The burners 30 and 31 therefore heat the muffle 29 and such heat is then imparted to ceramic bodies passing through said muffle by radiation.

The furnace C, which may be said to be a glost furnace, is longitudinally spaced from the furnace B so as to permit the application of a glaze or frit to the ceramic bodies passing from furnace B into furnace C. Such glaze applying means are indicated as consisting of a frit hopper 32 and a vibrating screen or other feeding mechanism 33 positioned in the space between furnaces B and C. In order to speed up the maturing of the glaze upon the ceramic bodies, heat may be applied to the grids or tile during the glaze applying operation. Electric heaters are particularly adapted for this purpose, there being no gases of combustion to impair the color or quality of the glaze.

The fourth furnace, D, is substantially identical to furnace C, being also provided with a muffle 34 connecting the end walls of the furnace. Burners are positioned above and below said muffle in said furnace. The furnace D is longitudinally spaced from furnace C so as to permit a secondary application of frit or glaze to the ceramic bodies as by means of a gyratory screen or other means 35 connected with hopper 32 or a separate frit hopper. It is to be understood that the furnace D and the secondary frit or glaze applying means 25 may be eliminated when but a single glaze application to the ceramic bodies is employed.

The furnace E into which the ceramic bodies are finally discharged, is in effect an annealing furnace. It may consist of side walls, a forward end wall of arch construction similar to the arches 13, 14, 22 and 23, and a heat insulated roof indicated at 36. The side walls preferably support a muffle 37 extending from the inlet opening for some distance inwardly therefrom. Burners 38 are carried by the side walls of the furnace E above the muffle 37 and at a point adjacent the furnace D.

The ceramic bodies may be advanced from furnace B and through furnaces C and D into the furnace E by means of a supplementary conveyor mechanism consisting of a separate heat-resisting metal belt or flexible chains, actuated by a suitable roller or sprocket indicated at 40. Such conveying mechanism deposits the tile or other ceramic bodies from furnace D upon a mesh belt 41 extending through the muffle 37 of the furnace E to a discharge port 42 in the further end wall of the furnace E. The belt 41 is supported throughout the length of the furnace E on rollers or guide rails maintained in position by the side walls of the furnace E. The roof of the furnace E is preferably provided with a suction hood 43 leading to a suction conduit 44, said hood being provided with a damper 45. A branch suction line 46 may extend to a point immediately above the outlet opening 42, a damper 47 being provided in such branch conduit.

It will be evident, therefore, that furnace gases from furnace D will be drawn into the furnace E through the arch separating furnaces D and E and pass upwardly through the bottom and top flights of conveyor mechanism 41 and through the tile or ceramic bodies carried thereby before being discharged either through the suction hood 43 or the suction line 46 at the end of said furnace. It is to be understood that in order to facilitate cooling, air may be blown into the furnace E whenever such procedure appears to be desirable.

50 indicates a motor drive and 51 a suitable reduction gear by means of which the conveyor mechanism 41 is driven. The extension of the conveyor belt 41 beyond furnace E forms a sorting table on which the various ceramic bodies may be sorted and removed from the conveyor and/or the supports carried thereby. The supports or grids may then be returned to the make-up zone or table 4 by means of a gravity conveyor or other similar means in parallel relation to the series of furnaces but exteriorly thereof.

In the arrangement shown in Figs. 1 to 4 inclusive, it has been stated that conveyor belts of heat-resisting mesh, such as the conveyors 5 and 41, were employed. Although the ceramic bodies may rest directly on such belts, it is preferable to pass the ceramic bodies through the series of furnaces upon metallic supports made of heat-resisting material. Metallic supports on which the ceramic bodies are preferably held are shown in greater detail in Figs. 9, 10, 11 and 12. The metallic support shown in Fig. 9, for example, consists of a heat-resisting steel grid composed of parallel vertical elements 53 having plane upper edge portions 54 lying in substantially the same plane. These vertical elements 53 are held together by means of end portions 55 and by intermediate members 56. Furthermore, the upper and lower edges of the vertical members 53 may be provided with semi-circular spaced depressions indicated at 57, these depressions permitting the passage of gases under the tile or other ceramic bodies resting on the faces 54 of the members 53. If, for example, the tile bodies which it is desired to burn are provided with keys, the vertical members 53 are spaced apart sufficiently so as to permit the key portions of the tile bodies to fit between the vertical members 53 of the grids. The members 53 are preferably of a length substantially equivalent to the width of the conveying means 5 and 41 and of the furnaces A, B, C, D and E. The outside faces of the grids may be provided with spacing knobs 58 adapted to space adjacent grids from one another.

In operation, therefore, the ceramic bodies after being pressed by the apparatus indicated at 1, are placed upon the heat-resisting grids on the fettling table 2 or on the make-up table 4 and such supports or grids, together with the tile, are placed upon the conveying mechanism which will carry them through the series of furnaces A, B, C, etc. It is to be noted that the grids or supports are of an open construction whereby gases may readily pass therethrough. The ceramic body itself is supported at but a few points so that the heated gases may contact with both sides of the tile to a substantially equal degree.

These metallic grids or supports are preferably made of a heat-resisting steel or alloy capable of withstanding temperatures of 1800° F. to 2200° F. It has been found, for example, that a suitable grid or support may be made from a heat-resisting steel containing approximately 25% chromium, 20% nickel, 0.25% carbon and a negligible quantity of manganese and silicon. Not only is a heat-resisting steel of the above character capable of withstanding the high temperatures encountered, but in addition it has a low specific heat and a very high thermal conductivity.

A low specific heat is of importance in that the heat supplied to the furnaces A and B by the burners or heat sources 21, 24 and 25, is not absorbed by the grids or supports but instead is utilized in bringing the ceramic body up to the required maturing temperature. The high thermal conductivity of the support is essential in conveying whatever heat is absorbed thereby to the ceramic body.

During the passage of the ceramic bodies upon the heat-resisting grids or supports through the furnaces A, B, etc., the heat from the burners 21, 24 and 25 is therefore rapidly and uniformly conveyed to the body. When ceramic tile are burned on tunnel cars in an ordinary tunnel kiln, the tile bodies rest on refractory brick or tile forming the upper surface of the tunnel car. As a result, the tile bodies being burned receive all of their heat from burners positioned above the tile, whereby the tile bodies are unequally heated, the top receiving much more heat than the bottom. Moreover, the refractory brick or tile forming the deck of the car absorb tremendous quantities of heat because of the high specific heat of such refractory tile. As has been stated hereinbefore, the metallic grids or supports used in accordance with this invention are of low specific heat. Again, the refractory brick or tile forming the tunnel car of an ordinary tunnel kiln have a relatively low thermal conductivity so that the heat absorbed by such refractory tile is retained thereby and not conducted to the tile bodies which it is desired to burn.

The high thermal conductivity of the metallic grids used in accordance with this invention, however, permit the rapid transfer of heat to the bottom portions of the tile. The burners 8 and 25, for example, positioned beneath the conveyor 5, preheat the grids or supports on which the ceramic bodies are carried and this heat is immediately conducted by the support to the lower surfaces of the ceramic bodies. Moreover, the foraminous and open structure of the metallic grids or supports permits the circulation of heated gases around the ceramic bodies being burned, thereby insuring uniform and quick transfer of heat to said ceramic bodies.

It has been found in practice that the metallic grids or supports may be reused a great number of times without warping, scaling or other deterioration. It is possible to machine the surfaces 54 on which the tile are actually supported so that such supporting surfaces are in identically the same plane. As a result, the finished tile are plane and not warped. If, on the other hand, such ceramic bodies were to be supported on a refractory clay tile, as has been occasionally done heretofore the shrinkage and expansion of the clay tile would be imparted to the ceramic body being burned and as a result, the product would be non-uniform and warped.

It is also to be noted that the ceramic bodies which are being manufactured are retained on foraminous heat-resisting metallic supports during their entire passage through furnaces A, B, C, D and E. In the furnace A, the ceramic bodies are preheated; in furnace B, they are burned to maturity; in furnaces C and D the glaze is matured and in furnace E, the glazed ceramic bodies are annealed or cooled. Throughout this sequence of operations the ceramic bodies have been maintained upon a foraminous support which maintains its size and shape.

Figure 5:
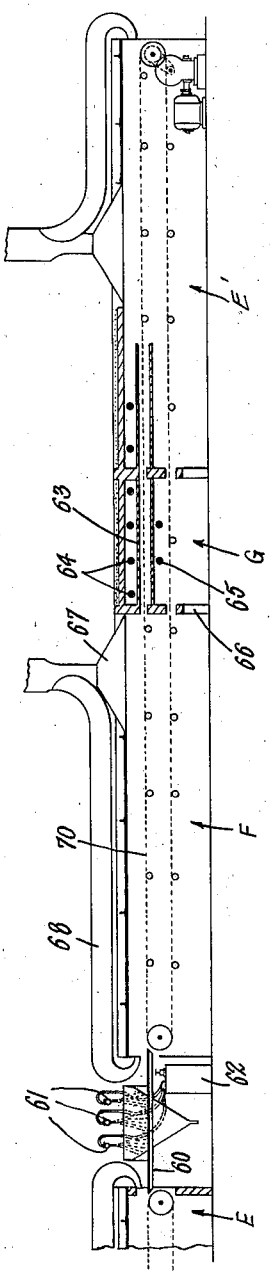
Fig. 5 is a side elevation and longitudinal section of a portion of an apparatus constructed in accordance with this invention and adapted to carry out the method thereof.

In the arrangement shown in Fig. 1, two successive applications of frit to the hot ceramic bodies are indicated. As has been intimated hereinbefore, the furnace D may be eliminated and the furnace E brought into position adjoining the furnace C whenever a single glaze application is desired. Furthermore, it is not necessary to apply the frit to hot ceramic bodies. Instead, the glaze may be applied to cool ceramic bodies. The glaze applied to cool ceramic bodies may be either in the form of a powdered frit or a liquid. The liquid application of glaze to a ceramic body may include furnace A followed by furnace B and then furnace E. As shown in Fig. 5, the ceramic bodies from furnace E may be discharged upon guide rails 60 over which the ceramic bodies (preferably on the metallic supports described hereinbefore) are passed. In their passage over the guide rails 60, the ceramic bodies are subjected to a spray of liquid glaze composition through nozzles 61, said nozzles being supplied with the liquid glaze composition from the storage tank 62 under pressure. The glazed ceramic bodies then move into a furnace F and then into a furnace G. The furnace G is similar to furnaces C and D previously described, in that it includes a muffle 63 and burners 64 positioned above the muffle as well as burners 65 positioned below the muffle.

The furnace F is supplied with heated gases from the furnace G, the gases passing from the furnace G through a port indicated at 66, said port being formed in the end wall of the furnace G. The gases from the furnace G thus pass upwardly through the conveying mechanism such as the heat-resisting metallic conveyor 70, and are removed from the furnace F by means of the suction hood 67 or the suction line 68. In this manner, the glaze is dried and partially set upon the ceramic bodies in the furnace F before such ceramic bodies enter the high temperature furnace G wherein the glaze is matured. After passing through the furnace G, the glazed ceramic bodies are then discharged into a furnace E', substantially identical in construction to the furnace E of Fig. 1. In said furnace E', the ceramic bodies are annealed and cooled to a temperature which permits their discharge into the open air without checking or crazing the glaze.

In the apparatus described hereinbefore, reference has been repeatedly made to a heat-resisting mesh belt as the means utilized for conveying the ceramic bodies and the grid supports through the various furnaces. As has been stated heretofore, however, numerous other means of conveying the grids and ceramic bodies may be utilized.

For example, as shown in Fig. 6, the conveying mechanism extending through the various furnaces may comprise a plurality of longitudinally aligned heat-resisting metallic rails 71 and 72, said longitudinal rails 71 and 72 being supported by the side walls of the furnaces as by means of members 73. The grid supports slidably rest upon the guide rails 71 and 72 and are moved therealong by means of link chains 74 and 75 carried upon suitable sprockets 76 and 77 respectively, said sprockets 76 and 77 being mounted on a shaft 78 driven in any suitable manner. The two chains 74 and 75 may be connected together at spaced intervals by means of heat-resisting metallic rods 79, 80, 81, and the like. These rods slide upon the guide rails 71 and 72 and push the grid supports resting on the guide rails.

The above described method and apparatus for moving the grids through the furnaces has been found to be very effective. The circulation of gases is not impeded, as is somewhat the case when a heat-resisting metal mesh belt is employed.

If desired, a walking beam arrangement similar to that shown in Fig. 7 may be used. An intermittent motion is thus imparted to the grid supports passing through the furnaces. The grid supports rest upon the longitudinal guide bars 71' and 72'. Intermediate or walking beams 82 and 83 are employed, said walking beams 82 and 83 being vertically raised into contact with the grid resting on the fixed beams 71 and 72 by means of the pin 84 carried by the crank 85, said crank being driven by means of a shaft 86 mounted in a suitable bearing, not shown.

It is to be understood that Figs. 6 and 7 merely diagrammatically illustrate forms of apparatus which may be employed in advancing the supports through the various furnaces, the details of such structures being available to those skilled in the art. Moreover, instead of employing the sprockets 74 and 75 and push rods 79 and 80 of Fig. 6, any other means of pushing the grids along the guide rails 71 and 72 may be employed. If desired, the guide rails 71 and 72 may be inclined from the inlet to the outlet end of the furnaces so as to facilitate the sliding movement of grids thereon. Instead of using slide rails, such as 71 and 72, a roller rail may be employed. The roller rail may consist of a channel of heat-resisting metal positioned with its open end towards the top and a plurality of adjacent rollers rotatably mounted in the flanges of the channel, said rollers extending above the edge of the channel. The grids may rest upon and roll on the rollers carried by such channels.

Figure 9:
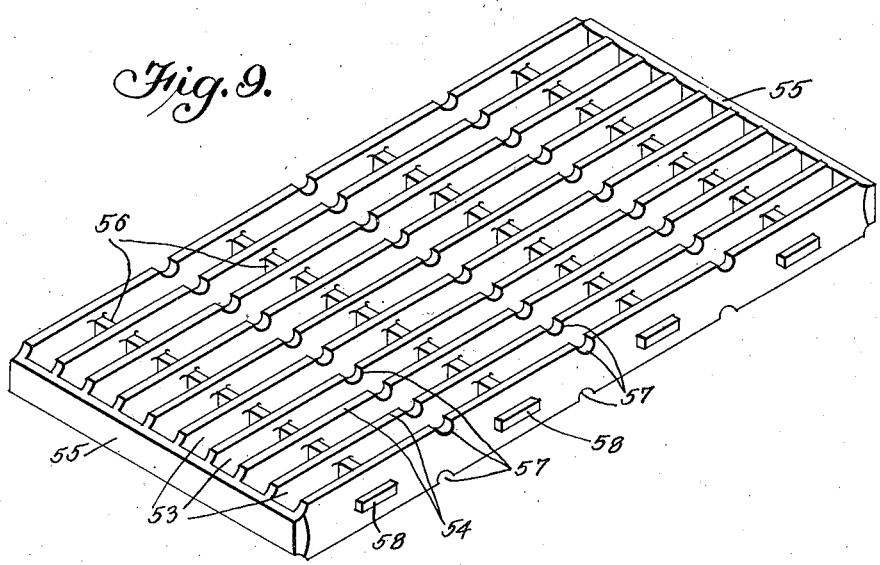
Fig. 9 illustrates a form of grid or support adapted for use in the method and apparatus of this invention.
Figure 10:
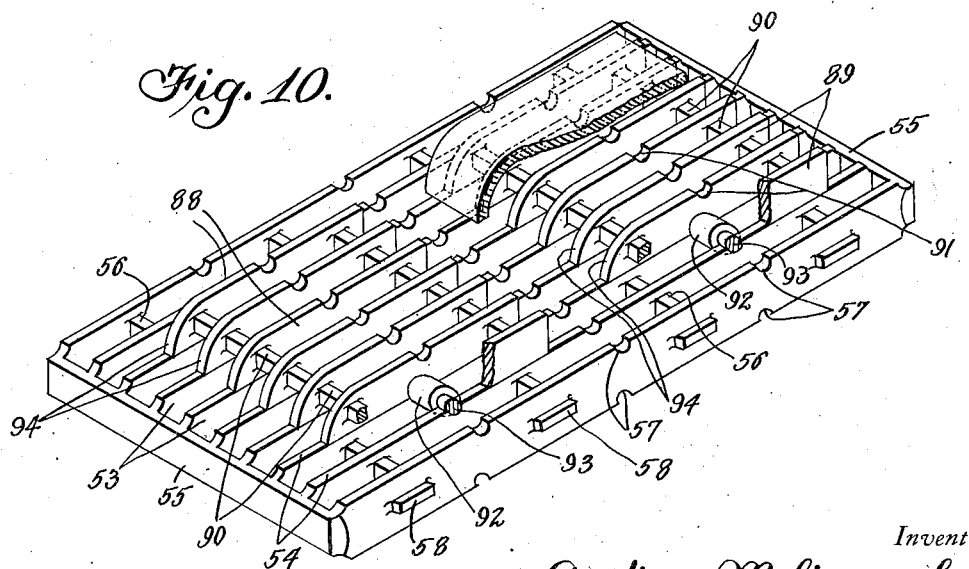
Fig. 10 illustrates an auxiliary grid in combination with the grid of Fig. 9.

Fig. 9 discloses one type of grid support. Fig. 10 illustrates a grid support of the character shown in Fig. 9 with the addition of an auxiliary grid, said auxiliary grid being particularly adapted for use whenever curved tile are being manufactured. The auxiliary grid may comprise a plurality of longitudinal members 88 and 89 connected together by means of members 90. The longitudinal members 88 and 89 are spaced from each other by the connecting members 90 a distance equivalent to the spacing between the longitudinal members 53 of the major grid. Furthermore, the members 88 and 89 are provided with semi-circular depressions in their edges, such depressions being indicated at 91. In order to attach the auxiliary grid to the main grid, attaching pins 92 provided with axial portions 93 of a reduced diameter capable of snugly fitting the semi-circular depressions 57 and 91, are employed. The reduced portions 93 of the attachment pins prevent the auxiliary grid from moving longitudinally of the members 53, whereas the enlarged body portions 92 of the attachment pins prevent the auxiliary grids from moving transversely to the members 53.

As shown in Fig. 10, the auxiliary grid members 88 and 89 are provided with a curved end 94 adapted to receive and support the curved portion of a stair riser tile.

Figure 11:
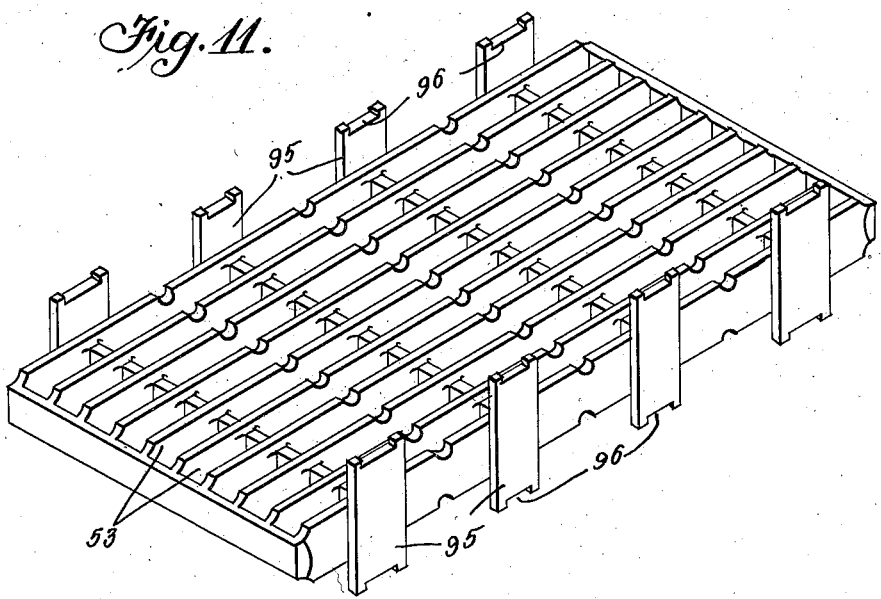
Fig. 11 illustrates a reversible form of support capable of being used in stacked relation with the support of Fig. 9.

Fig. 11 shows a modified form of grid support made from heat-resisting metal of the character described, the grid of Fig. 11 being particularly adapted for use in conjunction with a grid of the character shown in Fig. 9. It is to be noted that the grid of Fig. 11 is substantially identical to that shown in Fig. 9 with the exception that instead of spacer lugs 58, the grid of Fig. 11 is provided with ears 95 extending above and below the grid proper, said ears 95 being adapted to rest upon and partially encircle the lugs 58 of the grid 9. For this purpose, the upper and lower ends of the ears 95 are provided with a depression 96 adapted to receive the ears 58. It will be obvious that grids of the character shown in Fig. 11 may be stacked upon grids of the character shown in Fig. 9 and when these two types of grids are used alternately, a stack of any desired height may be built up.

Figure 12:
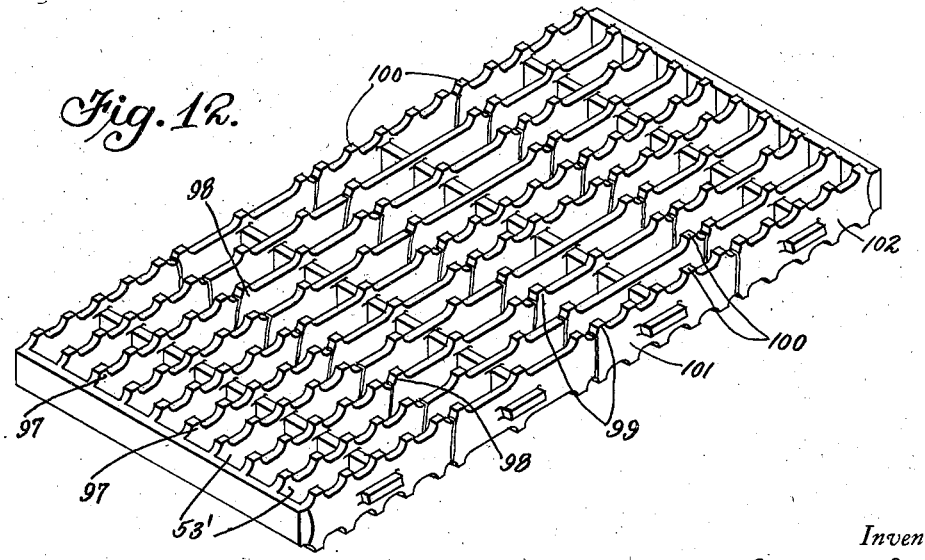
Fig. 12 illustrates various forms which the supports may assume.

Fig. 12 is a composite view of a plurality of different forms that grids suitable for use in this invention may assume. The longitudinal members 53' of the composite grid shown in Fig. 12 may be provided with a plurality of upwardly extending points of support 97, 98, 99, etc., all of these points of support being provided with flat supporting faces 100 lying in the same plane. In this manner, by judicially positioning the upwardly extending points of support 97, 98, 99, etc., tile provided with various types of keyways or keys may be properly supported. For example, the grid section indicated at 101 is adapted to receive two tile points of support being provided for the edge portions and a single point of support for the center. In grid section 102, there are a plurality of points of support for the edge portions of the tile and four points of support for the center.

Although the invention has been described in considerable detail, it will be obvious to those skilled in the art that numerous changes and modifications may be made therein. The invention is not to be limited to the specific forms of apparatus employed as the apparatus shown herein is merely illustrative of types of devices, units and arrangements thereof which may be employed. The arrangement of furnaces and their sequence is dependent upon the type of ceramic body being burned and upon the desirability of applying one or more glaze compositions thereto.

In general, it may be said that the invention primarily relates to a method of burning ceramic bodies wherein the molded ceramic bodies are supported during a sequence of burning and cooling operations upon grids made from a heat-resisting metal having a lower specific heat but a higher thermal conductivity than the ceramic body. Furthermore, the invention relates to a method in which heat is imparted to the ceramic bodies while they are supported upon heat-resisting metallic grids by the transmission and conduction from the metallic grids. Moreover, the invention relates to a method wherein ceramic bodies are supported upon metallic grids of the character stated and sequentially subjected to heating, maturing, glazing, glost firing, and cooling operations. The invention also relates in general to apparatus adapted for use in the methods described.

All such changes and modifications as come within the scope of the appended claims are embraced thereby.

I claim:

1. In a process of biscuiting and glazing ceramic bodies, the steps of placing ceramic bodies upon separate heat-resisting metallic supports adapted to maintain the shape of the ceramic body, imparting heat to said metallic supports, and transferring heat from said supports to said ceramic bodies.

2. In a process of biscuiting and glazing ceramic bodies, the steps of placing ceramic bodies upon separate heat-resisting metallic supports having a lower specific heat than said ceramic bodies, but a higher thermal conductivity than said ceramic bodies, said supports being adapted to maintain the shape of the ceramic bodies imparting heat to said metallic supports, and transferring heat from said supports to said ceramic bodies.

3. In a method of producing ceramic bodies, the steps of placing molded unburned ceramic bodies upon a plurality of spaced planes of separate heat-resisting metallic supports having a lower specific heat than said ceramic bodies but a higher thermal conductivity than said ceramic bodies, said supports being adapted to maintain the molded shape of the ceramic bodies and then drying and burning said ceramic bodies while carried by said metallic supports by exposing said ceramic bodies and supports to a progressively increasing temperature.

4. In a continuous method of burning ceramic bodies, the steps of placing ceramic bodies upon separate heat-resisting metallic supports having a lower specific heat than said ceramic bodies and a higher thermal conductivity than said ceramic bodies, said supports being adapted to maintain the molded shape of the ceramic bodies moving said supports and ceramic bodies carried thereby over a source of heat to preheat said supports and dry said bodies, then moving said supports and ceramic bodies carried thereby into a heating zone to mature the ceramic bodies, then passing said supports and ceramic bodies into a glazing zone, applying a solid glazing material to the top of said ceramic bodies in said glazing zone, then moving said supports and bodies into a heating zone to mature said glazing material, and finally cooling said bodies while carried by said supports.

5. In a continuous process of making ceramic bodies, the steps of continuously advancing ceramic bodies while supported upon separate metallic heat-resisting supports having a lower specific heat than said ceramic bodies, said supports being adapted to maintain the shape of the ceramic bodies through drying, biscuiting, glaze-applying, glaze-maturing, and cooling zones successively.

6. In a continuous process of making ceramic bodies, the steps of continuously advancing ceramic bodies while supported upon separate metallic heat-resisting supports having a lower specific heat than said ceramic bodies, said supports being adapted to maintain the shape of the ceramic bodies through drying, biscuiting, cooling, glaze-applying, glaze-maturing, and cooling zones successively.

7. In a continuous process of making ceramic bodies, the steps of continuously advancing ceramic bodies while supported upon separate metallic heat-resisting supports having a lower specific heat than said ceramic bodies, said supports being adapted to maintain the shape of the ceramic bodies through drying, biscuiting and cooling zones successively.

8. In an apparatus for drying, maturing and glazing ceramic bodies in a continuous manner, the combination of: heat-resisting metallic means extending in a substantially horizontal plane to form a line of support; a plurality of foraminous or reticulate metallic supports for ceramic bodies carried by said line of support; two spaced furnaces surrounding longitudinally spaced portions of said line of support, each of said furnaces being provided with heat-imparting means positioned above and below said line of support; a glaze-applying means in operative relation to said line of support, positioned between said spaced furnaces; an enclosure around another portion of said line of support adjacent one of said furnaces, heat-supplying means in said enclosure adjacent said furnace and beneath said line of support, said heat-supplying means being adapted to impart heat to said metallic supports and ceramic bodies carried thereby; and means for advancing said foraminous metallic supports and ceramic bodies carried thereby along said line of support from said enclosure and through said furnaces.

9. In an apparatus for producing ceramic articles, the combination of a plurality of furnaces in alignment, said furnaces being provided with end walls, conveying means adapted to sequentially convey ceramic bodies through said furnaces in a plane above the bottom of said furnaces, burners positioned in the side walls of said furnaces above and below the plane of said conveying means, the end walls of adjoining furnaces being provided with a port below the plane of said conveying means whereby heated gases from the top of one furnace may pass into the bottom of an adjoining furnace.

10. In an apparatus for producing ceramic articles, the combination of a plurality of furnaces in alignment, said furnaces being provided with end walls, said end walls being provided with ports spaced from the bottom of said furnaces, conveying and guiding means extending through said ports and adapted to sequentially convey ceramic bodies through said furnaces, burners positioned in the side walls of one of said furnaces above and below the plane of said conveying means, a port in the end wall of adjoining furnaces below the plane of said conveying and guiding means whereby heated gases from the top of one furnace may pass into the bottom of an adjoining furnace.

11. In an apparatus for producing ceramic articles, the combination of two furnaces in alignment, each of said furnaces being provided with side and end walls, said end walls being provided with ports spaced from the bottom of said furnaces, guiding and conveying means in said furnaces adapted to support and convey ceramic articles through said furnaces and through said ports, a suction means operatively connected to the inlet port of the first of said furnaces, burners in said furnace positioned below the plane of said conveying and guiding means, a muffle enclosing said conveying and guiding means in the other of said furnaces, burners positioned above and below said muffle, and a port in the end walls between said furnaces and below the plane of said conveying and guiding means whereby heated gases from the top of the latter furnace may pass into the bottom of the first named furnace.

12. In a method of producing ceramic bodies, the steps of placing molded unburned ceramic bodies upon separate heat-resisting metallic supports provided with spaced planes adapted to support and maintain the shape of the ceramic bodies, then inserting the supports and ceramic bodies carried thereby wholly into a heated zone, applying heat to said supports and ceramic bodies from above and below said supports to dry and burn said ceramic bodies while carried by said metallic supports, and finally removing the supports and ceramic bodies carried thereby from said heated zone.

ANDREW MALINOVSZKY.